United States Patent [11] 3,620,943

[72] Inventor John D. White
 Little Falls, N.J.
[21] Appl. No. 827,887
[22] Filed May 26, 1969
[45] Patented Nov. 16, 1971
[73] Assignee Celanese Coatings Company
 New York, N.Y.

[54] BLACK ANTIFOULING COATING COMPOSITIONS
 8 Claims, No Drawings

[52] U.S. Cl. .................................................... 204/148,
 204/197, 114/222
[51] Int. Cl. ....................................................... C23f 13/00,
 B63b 59/00
[50] Field of Search ........................................ 204/147–149,
 196, 197; 114/222

[56] References Cited
UNITED STATES PATENTS
3,010,886 11/1961 Chappell ..................... 204/149
3,497,434 2/1970 Littauer ....................... 204/196
3,505,758 4/1970 Willisford .................... 114/222

OTHER REFERENCES
" J. of Paint Technology," Vol. 41, 1969, pp. 285–303

Primary Examiner—Ta-Hsung Tung
Attorneys—T. J. Morgan, L. I. Grim and H. P. Price ABSTRACT: A method for preventing the growth of white calcareous deposits on black antifouling coated surfaces of marine vessels which are protected from corrosion by sacrificial metal anodes by applying to the surface a coating containing black iron oxide and copper compounds.

BLACK ANTIFOULING COATING COMPOSITIONS

BACKGROUND OF THE INVENTION

The field to which this invention is directed is to coating compositions which contain an antifouling agent.

The problem of protecting the underwater surfaces of marine structures from the action and attachment of marine fouling organisms has been a serious and long existing one. A number of different types of coating compositions have been used to solve this problem with varying degrees of success. Coatings of this type are described in 41 Journal of Paint Technology 285 (1969) in an article entitled "Marine Biology in Antifouling Paints."

The color of the surfaces of ships protected by antifouling paints is generally not a problem since such surfaces are below the waterline and do not have much of an effect upon the overall aesthetic appearance. However, in a camouflage system that color of the coating becomes very important. This is particularly so in the painting of submarines.

White or light-colored calcareous deposits will form on the surfaces of steel hulls in sea water which are protected from corrosion with sacrificial metal anodes and are coated with conventional black antifouling paints. Such calcareous deposits are various insoluble compounds of calcium and magnesium. These deposits will also form on metal anode-protected bare steel immersed in sea water but do not normally form on painted steel or steel protected with antifouling paints which are not black in color.

The formation of the white calcareous deposits on the black antifouling painted surface is a serious problem for two reasons. First, fouling organisms can grow on the calcareous deposits thus negating the effectiveness of the antifouling paint. Secondly, the white deposits on the black background upsets camouflage designs, particularly on submarines.

SUMMARY OF THE INVENTION

This invention pertains to black pigmented antifouling paints and in particular to black-colored antifouling paints which are suitable for use as camouflage paints on submarines. In another aspect this invention is directed to a process for preventing the growth of white calcareous deposits on black antiflowing painted steel surfaces, protected from corrosion by sacrificial metal anodes and immersed in sea water.

DESCRIPTION OF THE INVENTION

The black antifouling paints used in this invention contain black iron oxide as the only black pigment and copper or copper compounds as the antifouling components.

The copper antifouling pigment used in this invention is finely divided copper or copper-containing components. Cuprous oxide is preferred because of its high toxicity and antifouling effectiveness. The cuprous oxide can be any conventionally known type, anhydrous or hydrated, and types such as pyrometallurgical and electrolytic process cuprous oxide. Mixtures of copper is various forms can also be used, particularly mixtures of finely divided copper and couprous oxide.

Small amounts, up to about 3 weight percent of the total film-forming composition, of other toxic pigments can be used in admixture with the copper antifouling pigment without departing from the spirit of the invention. Examples of such pigments include tributyltin fluoride, mercuric oxide, arsenic oxide, bis(tri-n-butyltin) oxide, phenarsazine chloride and the like.

The black iron oxide utilized in this invention includes both the natural black iron oxide and the synthetic black iron oxide. Natural black iron oxide is made from magnetite ore which is ground dry and classified to produce the pigment which has a range of particles sizes from about 1 to 4 microns. The pigment contains at least about 94 percent by weight of $Fe_3O_4$, with minor amounts of $SiO_2$ and $Al_2O_3$.

Precipitated black iron oxide is made by the reaction of a ferrous salt and an alkali, followed by oxidation. The precipitate is washed until salt-free, filtered, dried and powdered. This pigment usually contains at least about 98 percent weight iron oxides, with the remainder being water, silica, calcium carbonate and alumina. Particle sizes range from about 0.1 to 1.5 microns.

The matrix which can be used in this invention is either the insoluble or soluble matrix type. The insoluble matrix type antifouling coating contains pigments and, as the vehicle, an organic film-forming resin which does not dissolve in sea water. The toxic pigment is released by continuous contact of toxic particles or by diffusion through the paint. Vehicles of this type include vinyl resins (vinyl chloride-vinyl acetate copolymers), chlorinated synthetic rubber, butyl rubber, phenolic-base varnishes and the like.

The soluble matrix type coatings are those in which the toxic and the vehicle are removed by dissolution of the vehicle, mechanical erosion of the vehicle and bacterial or biodegradable action on the vehicle. The prime ingredient in such a vehicle is rosin which will slowly dissolve in alkaline sea water. Other soluble vehicles are hydrogenated rosin and abietic acid. Mixtures of soluble and insoluble matrices can also be used as well as small amounts of natural and synthetic resinous compositions. Matrices used in antifouling paints are described in 41 Journal of Paint Technology 285 (1969).

In preparing the coating compositions of this invention the copper compound and the black iron oxide are blended with the organic vehicle by any suitable means, such as by milling or with high-speed mixing. Sufficient solvents, such as ketones, alcohols, esters and hydrocarbons, are added to obtain application viscosities. Generally, such solvents will be about 10 to 25 weight percent of the total composition. Small amounts of clays and other suspending agents can be used as well as plasticizers and the like.

The amount of copper compound used in this invention is about 50 to about 75 weight percent based on total solids (dry coating). The amount of black iron oxide is about 10 to about 25 weight percent, again based on total solids. The organic matrix is used in amount sufficient to form a continuous coating with tee pigments and is generally present in amounts of about 5 to 25 weight percent.

Although the antifouling coatings hereinbefore described can be used on any marine type structures, they are particularly adaptable for use on metal hulls which are protected from corrosion by cathodic protection. This method involves either the use of a sacrificial anode which corrodes preferentially and thus protects the coated surface by making it the cathode, or impressing, from an external source, a direct current counter to the natural corrosion current. The principles of galvanic corrosion are put to advantageous use. Sacrificial anodes are made from zinc, magnesium, and aluminum with zinc being preferred.

The following examples describe the invention in more detail. Parts where used are parts by weight.

EXAMPLE 1

A black antifouling coating composition was made from 59.03 parts cuprous oxide pigment, 10.18 parts of black iron oxide containing a minimum of 98 percent iron oxides, 2.34 parts vinyl resin, 9.62 parts rosin, 2.08 parts tricresyl phosphate, 0.36 part clay-suspending agent, 10.1 parts methyl isobutyl ketone, 6.17 parts xylene, and 0.12 part methanol.

EXAMPLE 2

A coating similar to example 1 was prepared using 59.03 parts of copper pigments which were a mixture of cuprous oxide and copper (90.6 percent cuprous oxide and 5.6 percent copper), in place of the cuprous oxide as used in example 1

EXAMPLE 3

This coating composition was made using lampblack in place of the black iron oxide. The components were: 63.16 parts cuprous oxide, 3.89 parts lampblack, 2.50 parts vinyl resin, 10.29 parts rosin, 2.23 parts tricresyl phosphate, 0.39 parts clay-suspending agent, 0.81 parts methyl isobutyl ketone, 6.6 parts xylene and 0.13 parts methanol.

EXAMPLE 4

This coating composition was made using the formula of example 3 but replacing the cuprous oxide with 59.03 parts of the copper pigment used in example 2.

One side of steel panels were coated with each of the compositions described in example 1 through 4. After the coatings were thoroughly dried, a large section of a zinc anode was attached to the unpainted side of each panel. The panels were then immersed in sea water for one week. White calcareous deposits formed on the black surfaces of the panels coated with the compositions of examples 3 and 4. No deposits formed on the panels coated with the composition of example 1 and 2.

It is to be understood that the foregoing detailed description is given merely by way of illustration and that many variations may be made therein without departing from the spirit of the invention.

The embodiments of the invention in which an exclusive property or privilege is claimed are defined as follows:

I claim:

1. A marine vessel, the steel hull of which is protected from corrosion by sacrificial metal anodes, the exterior of said hull being coated with an antifouling black camouflage paint which contains a black pigment and an antifouling ingredient, wherein said black pigment consists essentially of black iron oxide and said antifouling ingredient consists essentially of copper, copper compounds, or mixtures thereof.

2. The vessel of claim 1 wherein the antifouling ingredient is cuprous oxide.

3. The vessel of claim 1 wherein the paint contains about 50 to about 75 weight percent copper pigment and about 10 to about 25 weight percent black iron oxide, said weight percents being based on the total weight of dry coating.

4. The vessel of claim 1 wherein the sacrificial metal anode is zinc.

5. A process for preventing the formation of white calcareous deposits on black camouflaged painted exterior surfaces of submarines, said surfaces being protected from corrosion by sacrificial metal anodes which comprises applying to the exterior surface a black antifouling paint which contains only black iron oxide as the black pigment and copper, copper compounds or mixtures thereof as the antifouling ingredient.

6. The process of claim 5 wherein the antifouling ingredient is cuprous oxide.

7. The process of claim 5 wherein the paint contains about 50 to about 75 weight percent copper pigment and about 10 to about 25 weight percent black iron oxide, said weight percents being based on the total weight of dry coating.

8. The process of claim 5 wherein the sacrificial metal anode is zinc.

* * * * *

PO-1050
(5/69)

UNITED STATES PATENT OFFICE
CERTIFICATE OF CORRECTION

Patent No. 3,620,943          Dated November 16, 1971

Inventor(s)         John D. White

It is certified that error appears in the above-identified patent and that said Letters Patent are hereby corrected as shown below:

In column 1, line 57, delete "is" and insert --in--; line 58 delete "couprous" and insert --cuprous--; line 70, delete "4" and insert --40--.
In column 2, line 39, delete "tee" and insert --the--.
In column 3, line 1, delete "0.81" and insert --10.81--.

Signed and sealed this 23rd day of May 1972.

(SEAL)
Attest:

EDWARD M. FLETCHER, JR.           ROBERT GOTTSCHALK
Attesting Officer                 Commissioner of Patents

Dedication 3,620,943.—*John D. White*, Little Falls, N.J. BLACK ANTIFOULING COATING COMPOSITIONS. Patent dated Nov. 16, 1971. Dedication filed May 6, 1974, by the assignee, *Celanese Coatings Company*.
Hereby dedicates to the Public the remaining term of said patent.
[*Official Gazette August 27, 1974.*]